Figure 1:
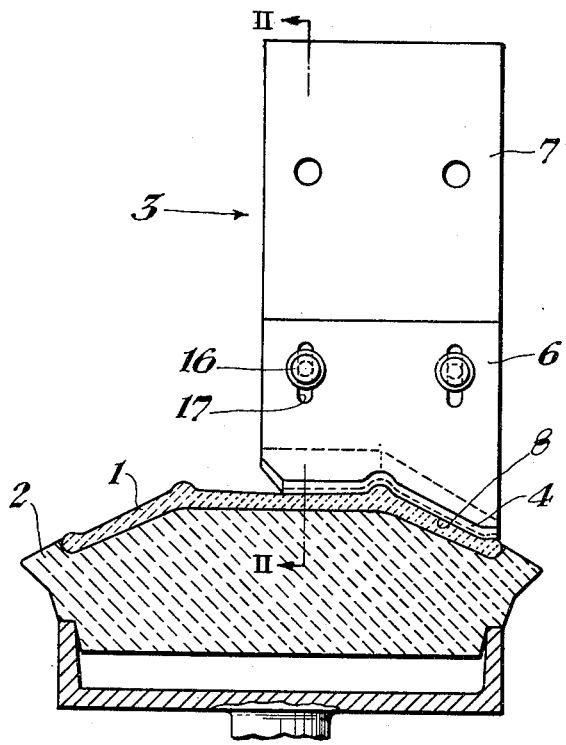

July 3, 1951 D. M. EDGAR 2,559,352
JIGGERING TOOL FOR POTTERY WARE
Filed July 2, 1949

INVENTOR
David M. Edgar.
BY
Brown, Critchlow, Flick & Peckham
HIS ATTORNEYS.

Patented July 3, 1951

2,559,352

UNITED STATES PATENT OFFICE 2,559,352

JIGGERING TOOL FOR POTTERY WARE

David M. Edgar, Pittsburgh, Pa., assignor to Miller Pottery Engineering Company, Pittsburgh, Pa., a corporation of Pennsylvania Application July 2, 1949, Serial No. 102,852

4 Claims. (Cl. 25—24)

This invention relates to the manufacture of articles formed of abrasive plastic materials such as pottery ware and, in particular, it is concerned with article forming tools such as the jiggering tools used in forming vitreous, or semi-vitreous dinner-ware.

In the manufacture of pottery ware, a flat plastic clay disc, or bat, first is fed onto a mold which then is carried by special conveying mechanism to certain ware forming stations, these normally being pressing and jiggering stations. At the pressing station, the mold, with its charge of green clay, is pressed against a die that preforms the ultimate ware contour, subsequent to which the mold is carried to the jiggering station where again its piece of ware is brought into contact with a jiggering tool, either the tool or the mold then being rotated to cause removal of a thin layer of the clay, thereby reducing the thickness of the ware, polishing its surface and relieving such strains as may be present.

The usual jiggering tool includes a steel blade that is formed with a beveled working, or leading, edge, the bevel providing a flat surface adapted to sweep off the desired layer of clay. Customarily, these blades are carried by a backing block, which in turn is attached to a jiggering tool arm, the lower edge of the block being contiguous with the beveled edge of the blade and, also, being beveled to continue the incline of the blade edge. However, the use of such tools is not as economical as could be desired since the clay rather quickly erodes the steel blades, as well as their backing blocks, to such an extent that the whole machine must be shut down until another tool is substituted or until the worn one can be reconditioned and replaced, this reconditioning being accomplished by grinding away a sufficient amount of the blade and block to reform the beveled working face and re-establish a sharp blade edge. From experience, such steel bladed tools are capable of jiggering only about 400 dozens of pieces of ware before they must be reconditioned.

In view of this uneconomically short life, blades have been formed of cemented hard metal carbides, such as tungsten carbide, the result being a very substantial increase in the tool life; average runs of such tools being about 12,000 dozens of pieces of ware. On the other hand, it soon was found that these blades were so brittle as to crack or shatter due to normal shocks experienced during the production runs. Another even more discouraging problem was introduced by the difficulty of reconditioning the tools. To understand this latter, it first should be recalled that not only the blades of jiggering tools are subjected to erosion, but also the portion of the backing block which is contiguous with the blade, this being due to the fact that, as the jiggering tool sweeps the surface of the clay, a ripple is formed ahead of the tool which contacts this contiguous portion of the backing block. When such wear of the backing block occurs, the tool must be reconditioned, this being accomplished by cutting, or grinding, away a sufficient amount of the tungsten carbide blade to again produce the continuous beveled working surface of the blade and the block. The difficulty then can easily be comprehended since, as is well-known, tungsten or other cemented carbides are extremely hard to cut; so hard, in fact, that very few pottery plants are equipped to perform the reconditioning and, consequently, must return the worn tools to the manufacturer or some other concern fitted to do the job. This necessity is, in itself, both expensive and time-consuming and, when it also is considered that the initial cost of the alloy is quite high, it will be understood how the advantages gained by its use are almost balanced out.

It is therefore among the objects of this invention to provide a pottery ware forming tool which is unusually long-lifed, and which can be reconditioned very quickly, inexpensively and easily without the necessity of filing its blade portion.

According to the invention, the tool utilizes a blade, formed of a cemented hard metal carbide such as carbides of tungsten, tantalum, titanium, cobalt and other cemented products compounded of two or more of them; the blade projecting outwardly of the tool from between a specially-contoured backing block on one side and a rigid plate on the other, this plate being used to reinforce the blade and avoid its cracking or shattering. The meeting surfaces of the plate and block lie flush against each other except for the lower portion of the plate which is recessed to receive the blade, the recess, preferably, being as deep as the width of the blade. In operation, the blade moves across the surface of the ware and thins the ware by sweeping off a small amount of the clay, and to accomplish this, its leading, or working, edge is beveled to form a flat sweeping surface. The backing block likewise, is specially contoured so that the portion contiguous to the blade continues the line, or angle, of the bevel of the blade's sweeping surface. Further, to facilitate reconditioning, the blade is rigidly secured to the plate and the plate, in turn, is adjustably secured to the backing block, the adjustability being such that the position of the blade with respect to the contoured, contiguous portion of the backing block can be changed. After a relatively long period of use, this specially contoured portion of the block will wear, but, when such occurs, the tool can be reconditioned simply by moving the blade upwardly and then using a simple filing instrument to file away enough of the backing block to reform the continuity of its bevel. Most suitably the backing block is formed of a material which is somewhat erosion-resistant but also easily filed so that it can be reformed very quickly, examples of such material being wood or Micarta.

Figure 2:
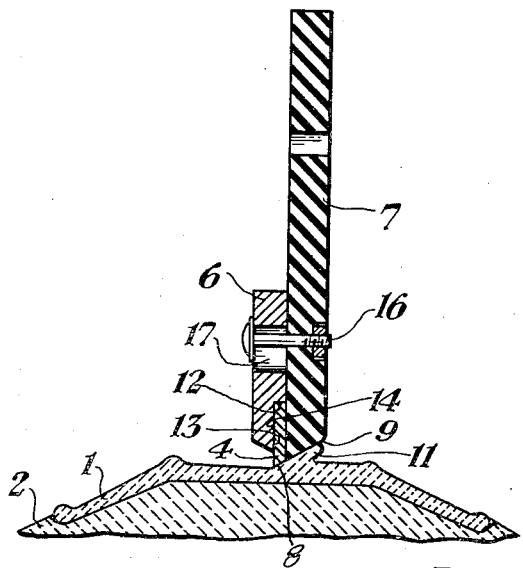

The preferred embodiment of the invention is illustrated in the accompanying drawings of which Fig. 1 is a rear elevation of the tool showing it engaging and forming the surface of a piece of pottery ware; and Fig. 2 a section along lines II—II of Fig. 1.

Referring to the drawings, a piece of pressed plastic clay 1 is shown being carried by a mold 2 which has been elevated from its conveyor (not shown) so as to bring the ware into contact with a jiggering tool 3. Generally, the tool is formed of three separate elements, these being a blade 4 formed of tungsten carbide, a reinforcing plate 6 formed preferably of a mild steel, and a backing block 7 formed of a material which is light, easily shaped and, to some degree erosion-resistant, such as wood, or Micarta. Blade 4 is provided with a beveled working surface 8, and, in addition, portion 9 of backing block 7 is shaped to continue the angle of the bevel of working edge 8 of the blade.

In operation, the mold, as well as the piece of clay carried by it, are rotated with the clay in engagement with the blade of the jiggering tool, the rotation being in a counterclockwise direction (Fig. 2) so that the beveled surfaces of the tungsten carbide blade and the mounting block press clay ahead of it, this portion of the clay normally assuming the form of ripple 11 (Fig. 2). The thing to be particularly noted in the operation of this tool is that ripple 11 not only contacts the blade, but also portion 9 of the backing block so that this portion eventually is eroded to such an extent that it becomes necessary to recondition the tool so as to reform the continuity of the beveled portions of the blade and the block to effect satisfactory jiggering.

The principal advantages secured by the present invention lie in the ease with which the present tool can be reconditioned, and this, in turn, results from the particular manner in which the blade is carried. Thus, blade 4 is rigidly secured, by brazing or other suitable means, to reinforcing plate 6, a recess 12 being provided in the lower portion of the inner wall 13 of this plate to receive the blade. Also, recess 12 is made of sufficient depth so that, when the blade is secured in position, inner wall 14 of the blade is aligned with inner wall 13 of the plate. The feature which facilitates the reconditioning of this tool is that blade-carrying plate 6 is adjustably mounted in block 7, such adjustable mounting, preferably, being provided by means of threaded bolts 16 extending through oval slots 17 of the plate and into the backing block, although other common adjustable mountings may be substituted, such for instance as providing the plate with a plurality of vertically spaced bolt-receiving holes.

With such an arrangement, when the backing block becomes eroded, reconditioning is very easily accomplished, simply by loosening bolt 16 and sliding plate 6 upwardly beneath the bolt, such movement of plate 6 raising the beveled edge of blade 4 at least as high as the most deeply eroded portion of the backing block so that the block can be filed away to reform its beveled working surface. The operation of reforming the block is very quickly accomplished since, as will be recalled, the block is formed of a material which is easily worked. Contrasting this reconditioning procedure with that required for the presently known jiggering tools, it should be noted that such prior tools required a grinding of the tungsten carbide blades, while the tool of the present invention completely avoids the necessity for any cutting operation on the blade. As a matter of experience, it has been found that tungsten carbide blades, or blades formed of other cemented hard metal carbides, are not worn to any appreciable extent even after unusually long, continuous jiggering operations. As a consequence, the present invention provides a jiggering tool capable of operating upon as many pieces of pottery ware as any tool now known to the applicant, and, in addition, a tool which can be very quickly and easily reconditioned.

According to the provisions of the patent statutes, I have explained the principle, preferred embodiment and mode of operation of my invention, and have illustrated and described what is now considered to represent its best embodiment. However, I desire to have it understood that, within the scope of the appended claims, the invention may be practiced otherwise than as specifically illustrated and described.

I claim:

1. A pottery ware forming tool comprising a tool-backing block, an erosion-resistant tool blade formed of hard metal and having a beveled ware-engaging edge, and a blade-reinforcing plate disposed against and adjustably carried by said block, said blade being secured to said plate and carried between said plate and block with its beveled edge projecting outwardly of the block, said block having a clay-engaging portion lying contiguous to and in the plane of the bevel of said blade edge, and said adjustable connection of said plate and block allowing said blade edge to be raised to a position above the clay-engaging portion of the block to permit said block portion to be reformed when worn.

2. A pottery ware forming tool comprising an erodible tool-backing block, a cemented hard metal carbide blade having a beveled ware-engaging edge, and a blade-reinforcing plate disposed against and adjustably carried by said block, said blade being secured to said plate and carried between said plate and block with its beveled edge projecting outwardly of the block, said block having a clay-engaging portion lying contiguous to and in the plane of the bevel of said blade edge, and said adjustable connection of said plate and block allowing said blade edge to be raised to a position above the clay-engaging portion of the block to permit said block portion to be reformed when worn.

3. A pottery ware forming tool comprising an erodible tool-backing block, a cemented hard metal carbide blade having a beveled ware-engaging edge, and a blade-reinforcing plate disposed against and adjustably carried by said block, said blade being secured to and carried in a recess formed in said plate with its beveled edge projecting outwardly of the block, said block having a clay-engaging portion lying contiguous to and in the plane of the bevel of said blade edge, and said adjustable connection of said plate and block allowing said blade edge to be raised to a position above the clay-engaging portion of the block to permit said block portion to be reformed when worn.

4. A pottery ware forming tool comprising an erodible tool-backing block, a cemented hard metal carbide blade having a beveled ware-engaging edge, and a blade-reinforcing plate disposed against and adjustably carried by said block, said blade being permanently bonded to said plate and carried between said plate and block with its beveled edge projecting outwardly of the block, said block having a clay-engaging portion lying contiguous to and in the plane of the bevel of said blade edge, and said adjustable connection of said plate and block allowing said blade edge to be raised to a position above the clay-engaging portion of the block to permit said block portion to be reformed when worn.

DAVID M. EDGAR.

REFERENCES CITED

The following references are of record in the file of this patent:

UNITED STATES PATENTS

| Number | Name | Date |
|---|---|---|
| 637,781 | Headley | Nov. 28, 1899 |
| 1,430,309 | Kinnard | Sept. 26, 1922 |
| 1,481,913 | Kinnard et al. | Jan. 29, 1924 |

FOREIGN PATENTS

| Number | Country | Date |
|---|---|---|
| 507,360 | Great Britain | Mar. 28, 1938 |

OTHER REFERENCES

Machinery (page 320, column 2), September 18, 1947.